(12) United States Patent
Laine et al.

(10) Patent No.: US 11,834,034 B2
(45) Date of Patent: Dec. 5, 2023

(54) CONTROL UNIT AND A METHOD FOR DETERMINING A VALUE INDICATIVE OF A LOAD BEARING CAPABILITY OF A GROUND SEGMENT SUPPORTING A VEHICLE

(71) Applicant: Volvo Truck Corporation, Gothenburg (SE)

(72) Inventors: Leo Laine, Härryda (SE); Mats Jonasson, Partille (SE)

(73) Assignee: Volvo Truck Corporation, Gothenburg (SE)

( * ) Notice: Subject to any disclaimer, the term of this patent is extended or adjusted under 35 U.S.C. 154(b) by 310 days.

(21) Appl. No.: 17/599,077

(22) PCT Filed: Apr. 5, 2019

(86) PCT No.: PCT/EP2019/058710
§ 371 (c)(1),
(2) Date: Sep. 28, 2021

(87) PCT Pub. No.: WO2020/200482
PCT Pub. Date: Oct. 8, 2020

(65) Prior Publication Data
US 2022/0194361 A1 Jun. 23, 2022

(51) Int. Cl.
*B60W 30/02* (2012.01)
*B60C 23/00* (2006.01)
*B60G 17/0195* (2006.01)

(52) U.S. Cl.
CPC ........... *B60W 30/02* (2013.01); *B60C 23/002* (2013.01); *B60G 17/0195* (2013.01);
(Continued)

(58) Field of Classification Search
None
See application file for complete search history.

(56) References Cited

U.S. PATENT DOCUMENTS

2007/0271018 A1 11/2007 Hofmann et al.
2020/0093054 A1* 3/2020 Aesaert ................ A01B 79/005

FOREIGN PATENT DOCUMENTS

CN 204551320 U 8/2015
CN 105320049 A 2/2016
(Continued)

OTHER PUBLICATIONS

International Search Report and Written Opinion for International Patent Application No. PCT/EP2019/058710, dated Jan. 21, 2020, 12 pages.
(Continued)

*Primary Examiner* — Lail A Kleinman
(74) *Attorney, Agent, or Firm* — Withrow & Terranova, PLLC

(57) ABSTRACT

The present invention relates to a control unit for determining a value indicative of a load bearing capability of a ground segment supporting a vehicle. The control unit is configured to issue a control signal to the vehicle to thereby impart a motion change of the vehicle, and receive response information from the vehicle indicative of the vehicle's response to the imparted motion change. The control unit is further configured to, based on the response information, determine a vertical position change of at least one wheel of the vehicle, and based on the determined vertical position change and the imparted motion change, determine the value indicative of the load bearing capability of the ground segment.

29 Claims, 3 Drawing Sheets

(52) U.S. Cl.
CPC .......... *B60G 2300/026* (2013.01); *B60G 2400/0511* (2013.01); *B60G 2400/0512* (2013.01); *B60G 2400/0521* (2013.01); *B60G 2400/0522* (2013.01); *B60G 2400/102* (2013.01); *B60G 2400/52* (2013.01); *B60G 2400/64* (2013.01); *B60G 2400/822* (2013.01); *B60G 2500/32* (2013.01); *B60W 2300/125* (2013.01); *B60W 2520/16* (2013.01); *B60W 2520/18* (2013.01); *B60W 2530/10* (2013.01); *B60W 2552/40* (2020.02); *B60W 2710/223* (2013.01); *B60W 2720/10* (2013.01); *B60W 2720/30* (2013.01)

(56) References Cited

FOREIGN PATENT DOCUMENTS

| | | | | |
|---|---|---|---|---|
| CN | 105564435 | A | 5/2016 | |
| CN | 105829185 | A | 8/2016 | |
| DE | 102006016765 | A1 | 10/2007 | |
| EP | 2508057 | A1 * | 10/2012 | ........... A01B 69/007 |
| FR | 3071064 | A1 | 3/2019 | |
| WO | 2018220159 | A1 | 12/2018 | |
| WO | 2020177871 | A1 | 9/2020 | |

OTHER PUBLICATIONS

First Office Action for Chinese Patent Application No. 201980095154.4, dated Jun. 30, 2023, 17 pages.

\* cited by examiner

CONTROL UNIT AND A METHOD FOR DETERMINING A VALUE INDICATIVE OF A LOAD BEARING CAPABILITY OF A GROUND SEGMENT SUPPORTING A VEHICLE

This application is a 35 USC 371 national phase filing of International Application No. PCT/EP2019/058710, filed Apr. 5, 2019, the disclosure of which is incorporated herein by reference in its entirety.

TECHNICAL FIELD

The present invention relates to a control unit for determining a value indicative of a load bearing capability of a ground segment supporting a vehicle. Moreover, the present invention relates to a vehicle. Furthermore, the present invention relates to a method for determining a value indicative of a load bearing capability of a ground segment supporting a vehicle.

The invention can be applied in heavy-duty vehicles, such as trucks, buses and construction equipment. Although the invention will be described with respect to trucks, the invention is not restricted to this particular vehicle, but may also be used in other vehicles, such as bus or a car.

BACKGROUND

When operating a vehicle, such as a truck, it may be desired to know the load bearing capability of a ground segment onto which the vehicle is intended to be driven. To this end, a road sign may indicate a maximum allowable axle road pressure.

However, there are many roads without axle road pressure road signs and it is also possible that vehicle may need to be driven on a ground segment that is not a traditional road. As such, there is a need for gaining more information of the load bearing capability of ground segments.

SUMMARY

An object of the invention is to gain information of the load bearing capability of a ground segment in a more flexible manner as compared to using the above-mentioned road signs.

According to a first aspect of the invention, the object is achieved by a control unit according to claim 1.

As such, a first aspect of the present invention relates to a control unit for determining a value indicative of a load bearing capability of a ground segment supporting a vehicle. The control unit is adapted to:
  issue a control signal to the vehicle to thereby impart a motion change to the vehicle;
  receive response information from the vehicle indicative of the vehicle's response to the imparted motion change.

According the first aspect of the present invention, the control unit further is adapted to:
  based on the response information, determine a vertical position change of at least one wheel of the vehicle, and
  based on the determined vertical position change and the imparted motion change, determine the value indicative of the load bearing capability of the ground segment.

As such, by virtue of to the first aspect of the present invention, the control unit may be adapted to determine a load bearing capability of a ground segment using a vehicle being located on the ground segment. Information indicative of the load bearing capability may thereafter be used for various purposes. Purely by way of example, the information indicative of the load bearing capability may be communicated to other vehicles and/or the information may be stored in a memory associated with the vehicle.

Furthermore, by virtue of the fact that the vehicle is used for determining the load bearing capability, it is possible to obtain a value indicative of a current load bearing capability of a ground segment. Certain ground segments may exhibit different load bearing capabilities under different environmental conditions, e.g. depending on temperature and/or precipitation, and such dependencies may be difficult to capture using traditional methods using e.g. road signs or the like.

Optionally, the motion change comprises a speed change of the vehicle, preferably the motion change comprises a deceleration of the vehicle. A speed change of a vehicle is straightforward to achieve and such speed change may not necessarily be perceived as being disturbing by an operator of the vehicle.

Optionally, the control unit is adapted to determine the magnitude and direction of a speed change moment imparted to the vehicle from the speed change of the vehicle. The speed change moment may be relevant information when determining the load bearing capability, for instance when solving an equation of motion in order to determine a ground segment stiffness.

Optionally, the speed change moment is determined by determining a resulting moment imparted to the vehicle after the speed change and also by determining a starting moment imparted to the vehicle before the speed change, preferably the speed change moment being determined by subtracting the starting moment from the resulting moment.

Optionally, the motion change comprises a change of the vertical position of at least a portion of the vehicle relative to the ground segment. The change of vertical position may provide relatively accurate results of the load bearing capability, such as the stiffness, of the ground segment.

Optionally, the control unit is adapted to issue a signal to a wheel suspension system of the vehicle to thereby impart the vehicle the change of the vertical position of at least a portion of the vehicle relative to the ground segment. The use of the wheel suspension system implies a cost efficient way to achieve the change of the vertical position.

Optionally, the control unit is adapted to issue a signal to the vehicle to impart a torque to at least one wheel of the vehicle during the change of the vertical position of at least a portion of the vehicle relative to the ground segment, the control unit further being adapted determine a value indicative of the friction between the wheel and the ground segment.

The friction between the wheel and the ground segment need not necessarily be linearly dependent on the normal force imparted to the wheel for every normal force value. During the change of the vertical position of at least a portion of the vehicle relative to the ground segment, which may be used for determining the load bearing capability, at least one of the wheels of the vehicle may be imparted different normal force levels. As such, the above procedure implies that friction values may be determined for a plurality of different normal force levels which in turn makes it possible to determine e.g. a friction coefficient as a function of the normal force.

Optionally, the control unit is adapted to receive response information from at least one of the following sensor types: a wheel load sensor, a chassis inclination angle sensor, a vertical accelerometer and an inclination rate sensor. Any one of the above-mentioned sensors may provide useful information when determining the response information.

Optionally, the control unit is adapted to use information indicative of the rotational inertia along at least one axis of rotation of the vehicle when determining the value indicative of the load bearing capability of the ground segment, preferably the control unit being adapted to determine a value indicative of the rotational inertia. The rotational inertia may be useful when solving an equation of motion in order to determine a ground segment stiffness.

Optionally, the control unit is adapted to issue a signal to a wheel suspension of one or more wheels of the vehicle to set the stiffness of the wheel suspension to or above a predetermined stiffness threshold before issuing the control signal to the vehicle to thereby impart the motion change to the vehicle. Purely by way of example, the control unit may be adapted to issue a signal to a wheel suspension to set the stiffness of the wheel suspension to or above 90%, preferably to or above 95%, of a maximum stiffness, e.g. a maximum allowable stiffness, of the wheel suspension. In implementations of the wheel suspension comprising a pressurised medium, such as air, the control unit may be adapted to issue a signal to a wheel suspension to set the pressure of the wheel suspension medium to or above 90%, preferably to or above 95%, of a maximum pressure, e.g. a maximum allowable pressure.

When imparting a motion change to a vehicle in order to determine a value indicative of the load bearing capability of the ground segment, it would be beneficial if the influence from the stiffness of the chassis of the vehicle could be kept low. In order to reduce the influence of the chassis stiffness, the stiffness of the wheel suspension could be set to be relatively high, i.e. relatively stiff.

Optionally, the control unit is adapted to issue a signal to a tire pressure control system of the vehicle to set the tire pressure in one or more wheels of the vehicle to or above a predetermined pressure threshold before issuing the control signal to the vehicle to thereby impart the motion change to the vehicle. Purely by way of example, the control unit may be adapted to issue a signal to the tire pressure control system to set the tire pressure in one or more wheels of the vehicle to or above 90%, preferably to or above 95%, of a maximum tire pressure, e.g. a maximum allowable tire pressure.

As for the wheel suspension, high tire pressures imply a relatively low influence from the wheels' stiffness when determining the value indicative of the load bearing capability.

Optionally, the control unit is adapted to receive information indicative of a load individually imparted to at least one wheel of the vehicle during the motion change. By determining the load individually imparted to at least one wheel, it may be possible to determine a value indicative of the load bearing capability, such as the stiffness, without needing to solve the equation of motion for the entire vehicle.

Optionally, the control unit is adapted to determine an inclination change of the vehicle in response to the imparted motion change, on the basis of the response information. The inclination change may be useful when determining the vertical position of each one of the wheels of the vehicle.

Optionally, the value indicative of the load bearing capability is a value indicative of a stiffness of the ground segment.

A second aspect of the present invention relates to a vehicle comprising a control unit according to any one of the preceding claims.

A third aspect of the present invention relates to a method for determining a value indicative of a load bearing capability of a ground segment supporting a vehicle. The method comprises imparting a motion change to the vehicle.

Moreover, the method according to the third aspect of the present invention further comprises:
    determining vertical position change of at least one wheel of the vehicle, and
    based on the determined vertical position change and the imparted motion change, determining a value indicative of the load bearing capability of the ground segment.

Optionally, the motion change comprises a speed change of the vehicle, preferably the motion change comprises a deceleration of the vehicle.

Optionally, the method comprises determining the magnitude and direction of a speed change moment imparted to the vehicle from the speed change of the vehicle.

Optionally, the method comprises determining the speed change moment by determining a resulting moment imparted to the vehicle after the speed change and also by determining a starting moment imparted to the vehicle before the speed change, preferably the method comprises determining the speed change moment by subtracting the starting moment from the a resulting moment.

Optionally, the motion change comprises a change of the vertical position of at least a portion of the vehicle relative to the ground segment.

Optionally, the method comprises issuing a signal to a wheel suspension system of the vehicle to thereby impart the vehicle the change of the vertical position at least a portion of the vehicle relative to the ground segment.

Optionally, the method comprises imparting a torque to at least one wheel of the vehicle during the change of the vertical position of at least a portion of the vehicle relative to the ground segment, the method further comprising determining a value indicative of the friction between the wheel and the ground segment.

Optionally, the method comprises receiving response information from at least one of the following sensor types: a wheel load sensor, a chassis inclination angle sensor, a vertical accelerometer and an inclination rate sensor.

Optionally, the method comprises using information indicative of the rotational inertia along at least one axis of rotation of the vehicle when determining the value indicative of the load bearing capability of the ground segment, preferably the method comprises determining a value indicative of the rotational inertia.

Optionally, the method comprises setting the stiffness of a wheel suspension of one or more wheels of the vehicle to or above a predetermined stiffness threshold before imparting the motion change to the vehicle.

Optionally, the method comprises setting the tire pressure in one or more wheels of the vehicle to or above a predetermined pressure threshold before imparting the motion change to the vehicle.

Optionally, the method comprises receiving information indicative of a load individually imparted to at least one wheel of the vehicle during the motion change.

Optionally, the method comprises determining an inclination change of the vehicle in response to the imparted motion change on the basis of the response information.

Optionally, the value indicative of the load bearing capability is a value indicative of a stiffness of the ground segment.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the Drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a control unit according to the present invention of for which the method of the present invention could be carried out. However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
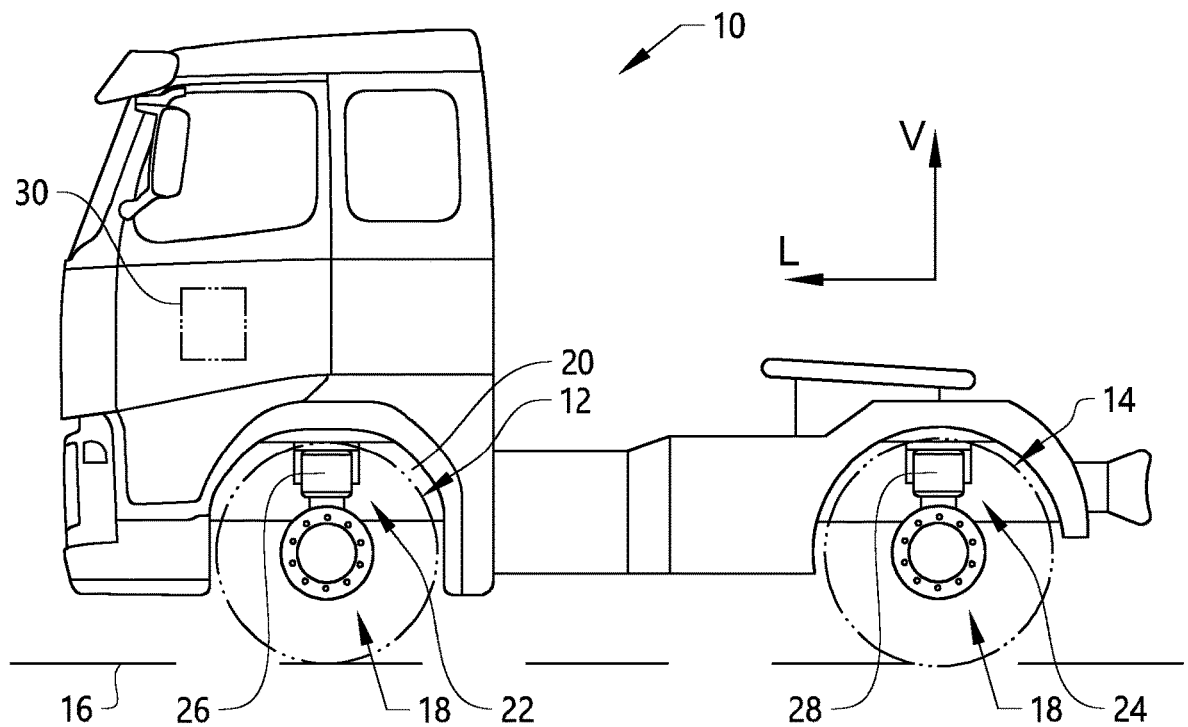
FIG. 1 is a schematic drawing of a vehicle according to an embodiment of the present invention.

The FIG. 1 vehicle 10 comprises a set of wheels 12, 14 each one of which being adapted to be supported by a ground segment 16. Although the FIG. 1 embodiment of the vehicle comprises a pair of front wheels 12 and a pair of rear wheels 14, it is of course envisaged that other embodiments of the vehicle 10 may comprise fewer or more wheels.

Further, the FIG. 1 embodiment of the vehicle comprises a wheel suspension system 18 connecting the wheels 12, 14 to a frame 20 of the vehicle 10. In the FIG. 1 implementation, the wheel suspension system 18 comprises a front wheel suspension system 22 connecting the frame 20 to the front wheel 12, and a rear wheel suspension system 24 connecting the frame 20 to the rear wheel 14. Furthermore, as indicated in FIG. 1, the front wheel suspension system 22 may comprise a flexible bellow 26 into which gas can be added or drained. In a similar vein, the rear wheel suspension system 24 may comprise a flexible bellow 28 into which gas can be added or drained. As such, the wheel suspension system 18 is arranged to damp/absorb loads from the respective wheel during motion of the vehicle 10. Furthermore, the wheel suspension system 18 can be used for controlling the height of the vehicle 10 relative to the ground segment 16. Purely by way of example, each one of the front wheel suspension system 22 and the rear wheel suspension system 24 can be used for changing the vertical position of at least a portion of the vehicle 10 relative to the ground segment 16.

In the below description, reference is generally made to only one front wheel 12 and only one rear wheel 14. However, it is to be understood that a reference to the front wheel 12 is equally applicable to the pair of front wheels. In a similar vein, a reference to the rear wheel 14 is equally applicable to the pair of rear wheels.

Additionally, FIG. 1 indicates that the vehicle extends in a longitudinal direction along a longitudinal axis L as well as in a vertical direction along a vertical axis V. The longitudinal axis L extends in a direction parallel to the intended direction of travel of the vehicle 10 and the vertical direction extends in a direction being normal to the plane of the ground segment 16.

The FIG. 1 vehicle 10 comprises a control unit 30 for determining a value indicative of a load bearing capability of a ground segment supporting a vehicle. Although FIG. 1 illustrates an embodiment in which the control unit 30 is physically connected to the vehicle 10, e.g. located in the vehicle 10 as illustrated in FIG. 1, the control unit 30 according to the first aspect of the present invention need not necessarily be physically connected to the vehicle 10. Instead, embodiments of the control unit 30 are contemplated in which the control unit 30 is separate from the vehicle 10 and adapted to communicate with the vehicle 10 using e.g. a wireless communication system (not shown).

Irrespective of its location relative to the vehicle, the control unit 30 is adapted to:

issue a control signal to the vehicle 10 to thereby impart a motion change to the vehicle;

receive response information from the vehicle 10 indicative of the vehicle's response to the imparted motion change;

based on the response information, determine a vertical position change of at least one wheel 12, 14 of said vehicle 10, and based on the determined vertical position change and the imparted motion change, determine the value indicative of the load bearing capability of the ground segment 16.

Figure 2:
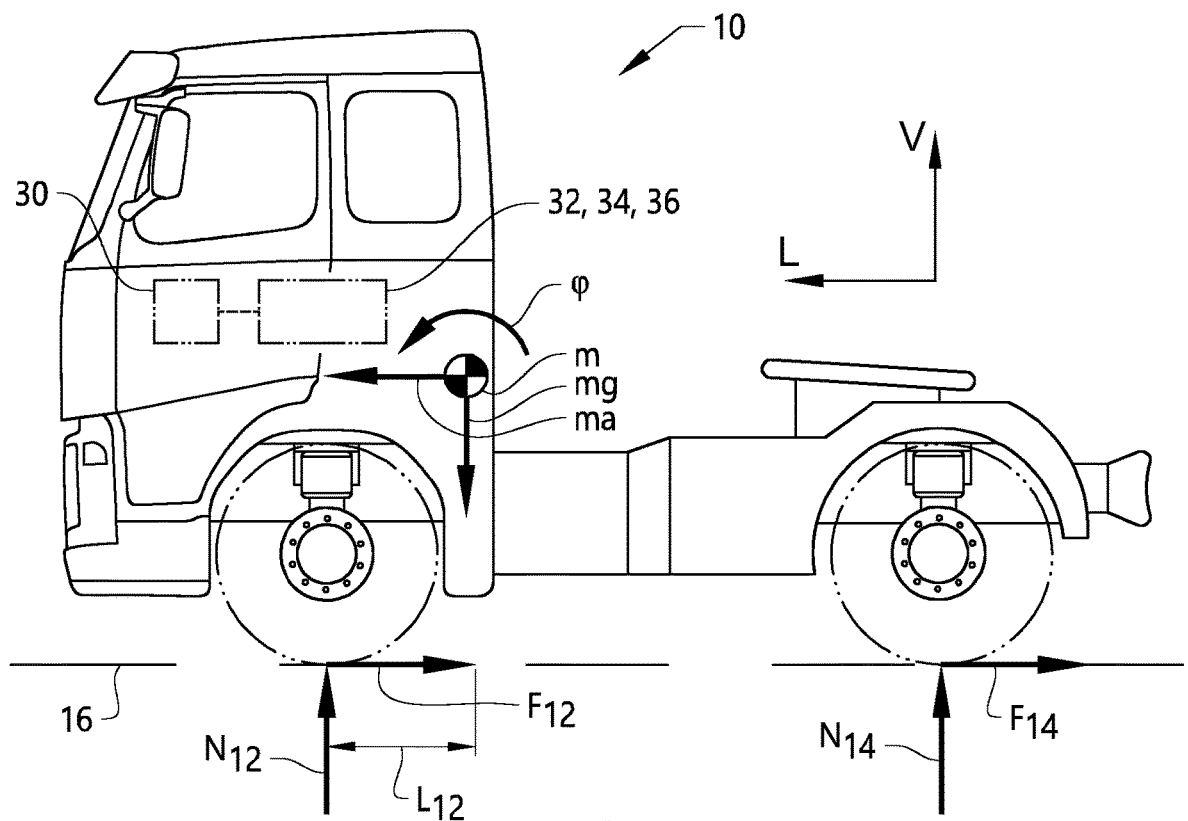
FIG. 2 is a schematic drawing of a vehicle according to another embodiment of the present invention.

As a first example, the motion change may comprise a speed change of the vehicle 10. As such, the motion change may comprise an acceleration or a deceleration of the vehicle 10. FIG. 2 illustrates an example in which the motion change is a deceleration.

As may be gleaned from FIG. 2, the vehicle 10 is imparted a plurality of loads during the deceleration. It should be noted that the vehicle 10 may be imparted loads in addition to the ones illustrated in FIG. 2 and discussed hereinbelow, such as drag loads. However, in the below presentation has been limited to discussing loads that are deemed to be sufficient for determining a value indicative of a load bearing capability of a ground segment 16 supporting a vehicle 10.

As indicated in FIG. 2, the vehicle 10 has a mass m located in a centre of gravity COG resulting in a gravity load mg. Furthermore, each one of the wheels 12, 14 is imparted a normal force $N_{12}$, $N_{14}$. During the retardation, the mass m results in an inertial load ma as well as friction loads $F_{12}$, $F_{14}$ on the wheels 12, 14. Moreover, the vehicle 10 may be imparted a drag load which is proportional to the square of the relative speed between the vehicle and the air surrounding the vehicle.

The above loads may result determine a vertical position change of at least one wheel 12, 14 of said vehicle 10 which in turn results in an inclination change of the vehicle 10. In FIG. 1, the inclination change is exemplified as a change of the pitch angle φ of the vehicle 10. However, it is of course also possible that the inclination change may be a change of the roll, alternatively a combination of roll and pitch. Purely by way of example, the inclination change may be determined using a chassis inclination angle sensor 32, such as a chassis pitch angle sensor, and/or an inclination rate sensor 34, such as a pitch rate sensor. As yet another alternative, the motion change, such as the inclination change, may be determined using a vertical accelerometer 36.

The equation of motion for an inclination condition is presented hereinbelow. In order to simplify the description, the below equation has been limited to a pitch motion but the equation could easily be modified so as to cover a general inclination, i.e. an inclination comprising a roll component as well as a pitch component. As a further alternative, the below equation could be applied for a pure roll condition. Irrespective of the inclination type, the equation can be formulated in accordance with the following:

$$M = I\ddot{\varphi} + B\dot{\varphi} + C\varphi \qquad \text{Eq. 1}$$

wherein:
M=moment imparted to the vehicle;
I=rotational inertia along an axis of rotation of the vehicle, exemplified as pitch inertia in Eq. 1;
B=rotational damping along at an axis of rotation of the vehicle, exemplified as pitch damping in Eq. 1;
C=rotational stiffness along an axis of rotation of the vehicle, exemplified as pitch stiffness in Eq. 1.

The moment M imparted to the vehicle 10 may be calculated in a straightforward manner using the loads imparted to the vehicle as well as the associated levers to a reference point, such as the COG of the vehicle. Instead of, or in addition to, calculating the moment M using the above-mentioned loads and levers, the moment M may be determined using e.g. an inertia measurement unit (not shown).

For the purpose of determining a value indicative of a load bearing capability of the ground 16 segment supporting a vehicle 10, the rotational damping may be assumed to be negligible such that B=0, resulting in the following equation.

$$M = I\ddot{\varphi} + C\varphi \qquad \text{Eq. 2}$$

The rotational inertia I may be determined in a plurality of ways. Purely by way of example, the rotational inertia may be determined by calculating the sum of a nominal inertia $I_0$ and an addition inertia $I_A$. As a non-limiting example, the nominal inertia $I_0$ may be determined during the design and/or construction of the vehicle 10. The addition inertia $I_A$ may for instance be established by determining the weight and the distance to the reference point for each one of a plurality of entities that have been added to the vehicle, as compared to the nominal configuration of the vehicle resulting in the nominal inertia $I_0$.

For instance, a cargo component, such as a parcel, may constitute such an entity. Knowing the weight and the distance to the reference point for each one of a plurality of entities, it is possible to determine the addition inertia $I_A$ using e.g. Steiner's theorem. A more detailed disclosure of how the inertia I may be determined can be found in PCT/EP2019/055766, which is hereby incorporated by reference.

The rotational stiffness C may be determined by assuming that the vehicle's chassis is stiff relative to the stiffness of the ground segment 16 and assuming that the ground segment 16 cannot result in a negative force in the vertical direction V to any one of the wheels 12, 14.

Thus, in a condition, such as the one illustrated in FIG. 2, where the vehicle 10 is imparted a positive pitch motion, viz counter-clockwise rotation in FIG. 2, the ground segment 16 will impart a resilient force onto the front wheel 12, the magnitude of which being dependent on the stiffness $k_{12}$ of the ground segment 16 beneath the front wheel 12 as well as the depression of the front wheel 12 into the ground segment 16.

Using the above assumptions as regards the rotational stiffness C, the rotational stiffness may be determined in accordance with the following:

$$C = k_{12} \cdot L_{12} \qquad \text{Eq. 3}$$

wherein:
$k_{12}$=the stiffness $k_{12}$ of the ground segment 16 beneath the front wheel 12, and $L_{12}$=the distance, in the longitudinal direction L, from the contact point between the front wheel 12 and the reference point, e.g. the centre of gravity, of the vehicle 10.

Inserting Eq. 3 into Eq. 2 results in the following equation:

$$M = I\ddot{\varphi} + k_{12} \cdot L_{12} \cdot \varphi \qquad \text{Eq. 4}$$

From with the stiffness $k_{12}$ of the ground segment 16 beneath the front wheel 12 can be determined in accordance with the following:

$$k_{12} = \frac{M - I\ddot{\varphi}}{L_{12} \cdot \varphi}. \qquad \text{Eq. 5}$$

The above equations Eq. 1-Eq. 5 have been presented in a condition in which the motion change is a speed change. In such a condition, though purely by way of example, the control unit 30 may be adapted to determine the magnitude and direction of a speed change moment $M_{SC}$ imparted to the vehicle 10 from the speed change of the vehicle. In such a condition, though again purely by way of example, the speed change moment $M_{SC}$ may be determined by determining a resulting moment $M_R$ imparted to the vehicle 10 after the speed change and also by determining a starting moment $M_S$ imparted to the vehicle 10 before the speed change. As a non-limiting example, the speed change moment $M_{SC}$ may be determined by subtracting the starting moment from the resulting moment in accordance with the following: $M_{SC} = M_R - M_S$. In the event that the speed change moment $M_{SC}$ is determined and used in e.g. Eq. 5, a speed change pitch $\varphi_{SC}$ of the vehicle 10—indicating the magnitude of the pitch change occasioned by the speed change moment $M_{SC}$—may be used in Eq. 5. In a condition in which the speed change pitch $\varphi_{SC}$ is used in the equation, the speed change pitch acceleration can be assumed to equal the pitch acceleration, viz $\ddot{\varphi} = \ddot{\varphi}_{SC}$.

Although equations Eq. 1-Eq. 5 have been presented in relation to a condition in which the motion change is a speed change, such as a deceleration, of the vehicle 10, the above equations are equally applicable to other types of speed changes. Purely by way of example, the motion change comprises a change of the vertical position of at least a portion of the vehicle 10 relative to the ground segment 16. As a non-limiting example, the control unit 16 may be adapted to issue a signal to the wheel suspension system 18 (see FIG. 1) of the vehicle 10 to thereby impart the vehicle 10 the change of the vertical position at least a portion of the vehicle relative to the ground segment 16.

Figure 3:
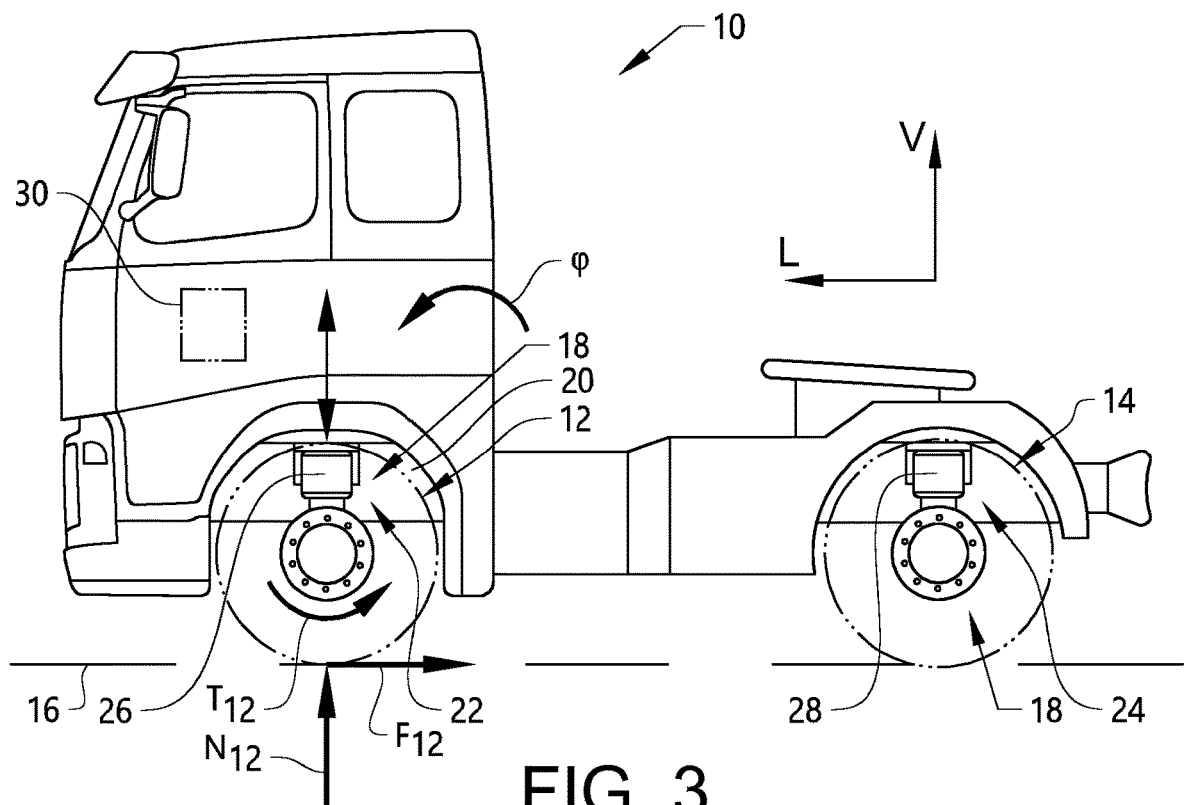
FIG. 3 is a schematic drawing of a vehicle according to a further embodiment of the present invention.

As such, using the condition in FIG. 3 as an example, the control unit 30 may be adapted to raise and lower the front portion of the vehicle 10 using the front wheel suspension system 22. Knowing the force imparted by the front wheel suspension system 22, it is possible to determine the moment imparted to the vehicle 10 and therefrom determine the load bearing capability, e.g. the stiffness $k_{12}$ of the ground segment 16, for instance using Eq. 5 again.

As another option, the vertical position of at least a portion of the vehicle 10 relative to the ground segment 16 may be achieved by arranging a weight (not shown) that is adapted to oscillate, e.g. to move back and forth, along a trajectory, at least a component of which being parallel to the longitudinal axis L, to thereby impart a varying pitch moment to the vehicle 10 which in turn will cause at least a portion of the vehicle to move up and down.

In a condition in which the motion change comprises a change of the vertical position of at least a portion of the vehicle 10 relative to the ground segment 16, the control unit 30 may be adapted to issue a signal to the vehicle 10 to impart a torque $T_{12}$ to at least one wheel 12 of the vehicle 10 during the change of the vertical position of at least a portion of the vehicle 10 relative to the ground segment 16. Furthermore, the control unit 30 may be adapted determine a value indicative of the friction between the wheel 12 and the ground segment 16.

As such, what the inventors of the present invention have realized is that the change of the vertical position of at least a portion of the vehicle 10 results in a varying normal force $N_{12}$ imparted to the wheel 12. As such, if the wheel is imparted a torque $T_{12}$ as the vertical position of the vehicle 10 changes, it is possible to determine as set of different combinations of friction forces $F_{12}$ and normal forces $N_{12}$. Such a set may then be used for determining the friction coefficient µ as a function of the normal force $N_{12}$. Here, it should be noted that the friction coefficient µ in many situations may vary with the normal force $N_{12}$. For instance, when the ground segment 16 comprises snow or ice, the friction coefficient µ may be highly dependent on the normal force $N_{12}$ since a large normal force $N_{12}$ may result in a friction coefficient µ being larger than the friction coefficient µ for a small normal force $N_{12}$. The above procedure may for instance be used when the wheel 12 is individually driven, e.g. by means of an individual electrical motor (not shown). However, it is also envisaged that the above procedure may be used for a vehicle wherein the wheels of one axle can be propelled independently of the wheels of the other wheels axles.

Although the above embodiments of the present invention have been present in relation to Eq. 1-Eq. 5, in which the global equation of motion has been solved for the vehicle 10, it may also be possible to determine the value indicative of a load bearing capability of the ground segment 16 by performing a local analysis of only a portion of the vehicle 10. For instance, if the load applied to a wheel as well as the depression of that wheel into the ground is known, it is possible to determine the value indicative of a load bearing capability of the ground segment 16, such as the stiffness of the ground segment 16.

Figure 4:
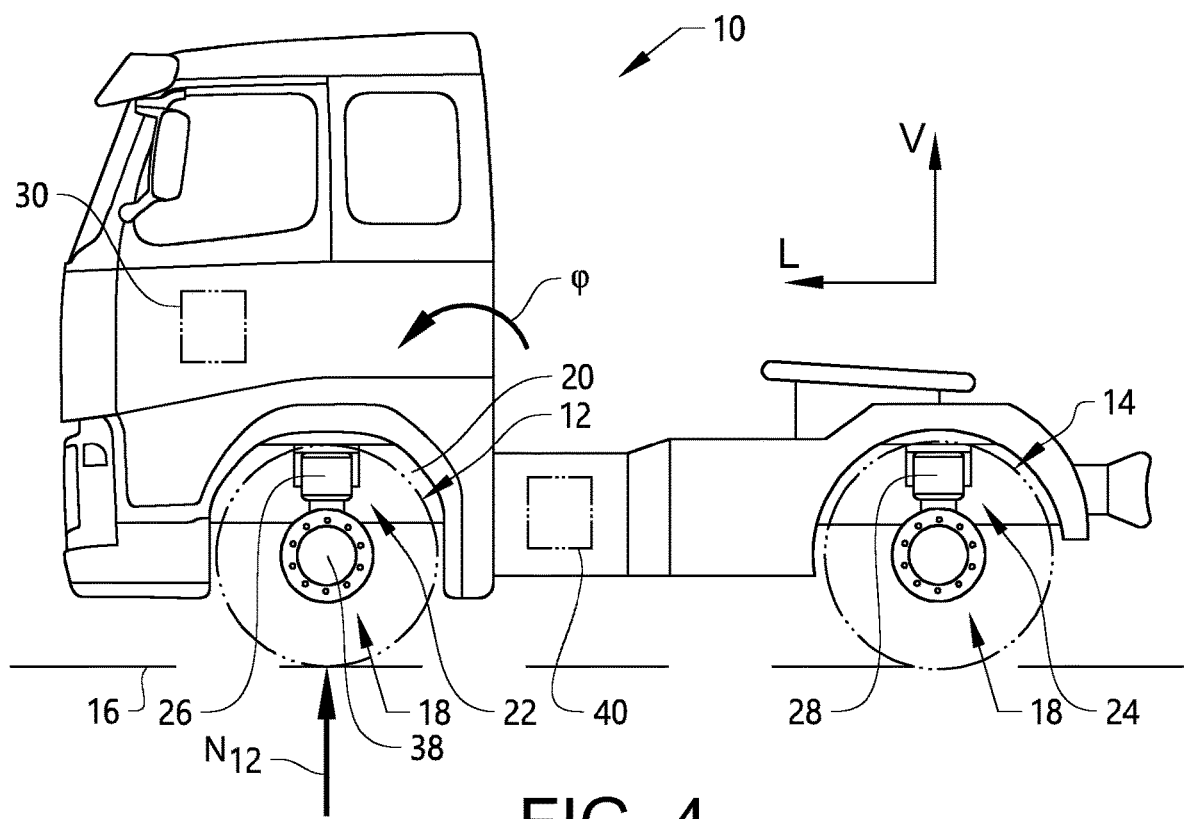
FIG. 4 is a schematic drawing of a vehicle according to yet another embodiment of the present invention.

As such, with reference to FIG. 4, and using the front wheel 12 as an example, it may be possible to determine the normal force $N_{12}$ imparted to the first wheel 12 using a wheel load sensor 38. Purely by way of example, the wheel load sensor 38 may be implemented as a wheel bearing load sensor, i.e. a sensor adapted to determine the load transferred from the wheel 12 to the frame 20 via a bearing, e.g. a hub bearing, connecting the wheel 12 to the frame 20. Instead of, or in addition to, the wheel bearing load sensor, the wheel load sensor 38 may be implemented as a sensor adapted to determine the load suspended by the front wheel suspension system 22. As a non-limiting example, such a sensor may be implemented as pressure sensor determining the pressure in the flexible bellow 26 of the front wheel suspension system 22.

Furthermore, a depression $d_{12}$ of the of the front wheel 12 into the ground segment 16 may be determined using e.g. the pitch angle φ and the distance from the reference point for the pitch angle to the contact point between the front wheel 12 and the ground segment 16.

Once the normal force $N_{12}$ and the depression $d_{12}$ have been determined, it is straightforward to determine the stiffness $k_{12}$ of the ground segment 16 in accordance with the following:

$$k_{12} = \frac{N_{12}}{d_{12}}.\qquad\text{Eq. 6}$$

Of course, it is also envisaged that embodiments of the control unit 30 and/or embodiments of the method according to the present invention can determine a value indicative of the load bearing capability using a global analysis as well as one or more local analyses. Purely by way of example, it is contemplated that embodiments of the control unit 30 and/or method may determine the stiffness $k_{12}$ using Eq. 5 as well as Eq. 6 and combine the results from the two equations, e.g. using weight factors.

As may be realized from the above, the accuracy of the value indicative of a load bearing capability of the ground segment 16 may be improved the closer the behaviour of the vehicle 10 mimics the behaviour of a rigid body.

To this end, the control unit 30 may be adapted to modify the characteristics of the vehicle before carrying out a procedure for determining the value indicative of a load bearing capability of the ground segment 16.

Purely by way of example, the control unit 30 may be adapted to issue a signal to a wheel suspension 22, 24 of one or more wheels 12, 14 of the vehicle to set the stiffness of the wheel suspension to or above a predetermined stiffness threshold before issuing the control signal to the vehicle 10 to thereby impart the motion change of the vehicle 10. As a non-limiting example, the control unit may be adapted to issue control signals for increasing the pressure in the bellows 26, 28. By increasing the stiffness of the wheel suspension 22, 24, the wheel suspension 22, 24 may be regarded as being relatively stiff, as compared to the stiffness of the ground segment 16, as a consequence of which the stiffness of the wheel suspension 22, 24 may have a relatively low impact on the behaviour of the vehicle 10 during the imparted motion change.

Instead of, or in addition to, increasing the stiffness of a wheel suspension 22, 24 of one or more wheels 12, 14, the control unit 30 may be adapted to issue a signal to a tire pressure control system 40 of the vehicle 10 to set the tire pressure in one or more wheels 12, 14 of the vehicle 10 to or above a predetermined pressure threshold before issuing the control signal to the vehicle 10 to thereby impart the motion change of the vehicle. As for the wheel suspension stiffness discussed above, setting the tire pressure so as to be relatively high may result in that the stiffness of one or more wheels 12, 14 may be relatively high which in turn may increase the accuracy of the determination of the value indicative of a load bearing capability of the ground segment 16.

Although the embodiments presented hereinabove have been exemplified as using an inclination, or an inclination change, of the vehicle 10 in order to determine a vertical position change of at least one wheel 12, 14 of the vehicle, it is envisaged that other embodiments may use other alternatives for determining the vertical position change.

Figure 5:
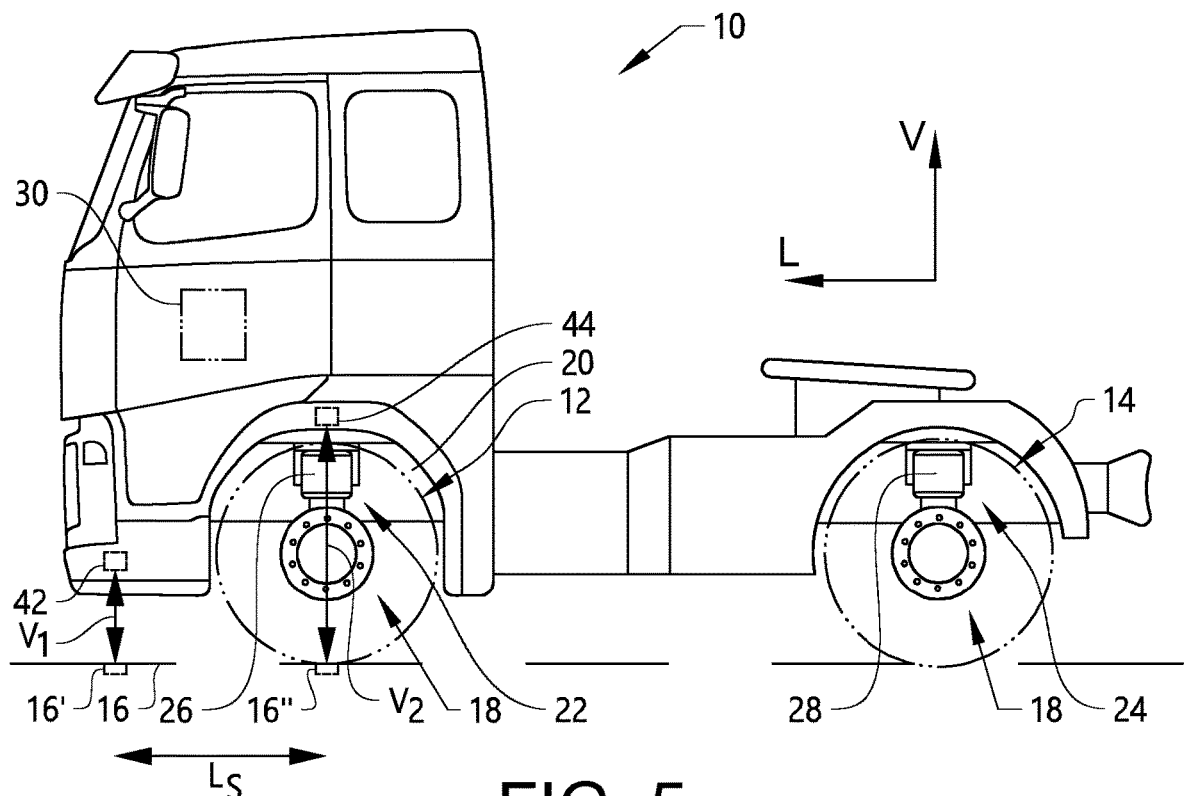
FIG. 5 is a schematic drawing of a vehicle according to still another embodiment of the present invention.

To this end, reference is made to FIG. 5, illustrating a vehicle 10 comprising a first vertical distance sensor 42 adapted to determine a first vertical distance $V_1$ between a reference point of the vehicle 10 and a first point 16' on the ground segment 16. Purely by way of example, the first vertical distance sensor 42 may be adapted to determine a first vertical distance $V_1$ between the location of the first vertical distance sensor 42 and the first point 16' on the ground segment 16.

In a similar vein, the FIG. 5 vehicle 10 comprises a second vertical distance sensor 44 adapted to determine a second vertical distance $V_2$ between a reference point of the vehicle 10 and a second point 16" on the ground segment 16. Purely by way of example, the second vertical distance sensor 44 may be adapted to determine a second vertical distance $V_2$ between the location of the second vertical distance sensor 44 and the second point 16" on the ground segment 16.

As indicated in FIG. 5, the first and second points 16',16" are located at a longitudinal sensor distance $L_S$ from each other. Moreover, as seen along the longitudinal axis L, the first point 16' is located in front of the first wheel 12 whereas the second point 16" is located at or behind the contact point between the first wheel 12 and the ground segment 16. In the FIG. 5 embodiment, the second point 16" is located at the contact point between the first wheel 12 and the ground segment 16 such that the second vertical distance $V_2$ is measured at a longitudinal location of the contact point between the first wheel 12 and the ground segment 16.

Using the above-mentioned first and second vertical distance sensors 42, 44 a vertical position change of at least one wheel 12, 14 (here exemplified using the first wheel 12) of the vehicle 10 may be determined in accordance with the following.

The first vertical distance $V_1$ between a reference point of the vehicle 10 and a first point 16' on the ground segment 16 is determined using the first vertical distance sensor 42 at a first time instant $t_1$. Using information indicative of e.g. the first vertical distance $V_1$ and possibly also an initial inclination angle, e.g. an initial pitch angle, of the vehicle 10, it is possible to determine an expected second vertical distance $V_{2,exp}$ at a second time instant $t_2$ when vehicle 10 has travelled the longitudinal sensor distance $L_S$ such that the second point 16" on the ground segment 16 at the second time instant $t_2$ is located at the longitudinal position of the first point 16' at the first time instant $t_1$ Moreover, using information indicative of the speed of the vehicle 10 as well as the longitudinal sensor distance $L_S$, it is possible to determine the second time instant $t_2$ as well as an actual second vertical distance $V_{2,act}$ at the second time instant $t_2$.

Using the expected second vertical distance $V_{2,exp}$ and the actual second vertical distance $V_{2,act}$, it is possible to determine the vertical position change of the first wheel 12.

Figure 6:
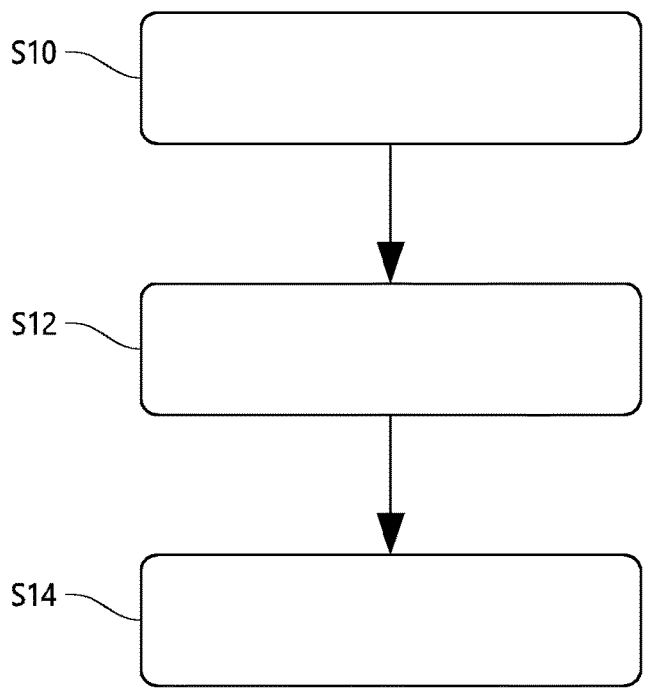
FIG. 6 is a flow chart illustrating an embodiment of a method according to the present invention.

The present invention also relates to a method for determining a value indicative of a load bearing capability of a ground segment supporting a vehicle. With reference to FIG. 6, the method comprises:

S10 imparting a motion change to the vehicle;
S12 determining vertical position change of at least one wheel of the vehicle, and
S14 based on the determined vertical position change and the imparted motion change, determining a value indicative of the load bearing capability of the ground segment.

Of course, embodiments of the method according to the present invention may comprise features of any one of the embodiments of the control unit 30 that have been discussed hereinabove. For instance, although each one of the above embodiments determines a stiffness value as the value indicative of a load bearing capability of a ground segment 16, it is also envisaged that other types of values may be determined. For instance, it is envisaged that embodiments of the present invention may determine the value indicative of a load bearing capability of a ground segment 16 in terms of load bearing levels, such as "low", "medium" or "high" or the like.

It is to be understood that the present invention is not limited to the embodiments described above and illustrated in the drawings; rather, the skilled person will recognize that many changes and modifications may be made within the scope of the appended claims.

The invention claimed is:

1. A control unit for determining a value indicative of a load bearing capability of a ground segment supporting a vehicle, the control unit configured to:
   issue a control signal to the vehicle to thereby impart a motion change to the vehicle;
   receive response information from the vehicle indicative of the vehicle's response to the imparted motion change;
   based on the response information, determine a vertical position change of at least one wheel of the vehicle, and
   based on the determined vertical position change and the imparted motion change, determine the value indicative of the load bearing capability of the ground segment.

2. The control unit of claim 1, wherein the motion change comprises a speed change of the vehicle.

3. The control unit of claim 2, wherein the control unit is configured to determine a magnitude and a direction of a speed change moment ($M_{SC}$) imparted to the vehicle from the speed change of the vehicle.

4. The control unit of claim 3, wherein the speed change moment ($M_{SC}$) is determined by determining a resulting moment ($M_R$) imparted to the vehicle after the speed change and also by determining a starting moment ($M_S$) imparted to the vehicle before the speed change.

5. The control unit of claim 1, wherein the motion change comprises a change of the vertical position of at least a portion of the vehicle relative to the ground segment.

6. The control unit of claim 5, wherein the control unit is configured to issue a signal to a wheel suspension system of the vehicle to thereby impart the change of the vertical position of least a portion of the vehicle relative to the ground segment to the vehicle.

7. The control unit of claim 5, wherein the control unit is configured to issue a signal to the vehicle to impart a torque to at least one wheel of the vehicle during the change of the vertical position of at least a portion of the vehicle relative to the ground segment, the control unit further being configured to determine a value indicative of a friction between the wheel and the ground segment.

8. The control unit of claim 1, wherein the control unit is configured to receive response information from at least one of a wheel load sensor, a chassis inclination angle sensor, a vertical accelerometer, and an inclination rate sensor.

9. The control unit of claim 1, wherein the control unit is configured to use information indicative of a rotational inertia along at least one axis of rotation of the vehicle when determining the value indicative of the load bearing capability of the ground segment.

10. The control unit of claim 1, wherein the control unit is configured to issue a signal to a wheel suspension of one or more wheels of the vehicle to set a stiffness of the wheel suspension to or above a predetermined stiffness threshold before issuing the control signal to the vehicle to thereby impart the motion change to the vehicle.

11. The control unit of claim 1, wherein the control unit is configured to issue a signal to a tire pressure control system of the vehicle to set a tire pressure in one or more wheels of the vehicle to or above a predetermined pressure threshold before issuing the control signal to the vehicle to thereby impart the motion change to the vehicle.

12. The control unit of claim 1, wherein the control unit is configured to receive information indicative of a load individually imparted to at least one wheel of the vehicle during the motion change.

13. The control unit of claim 1, wherein the control unit is configured to determine an inclination change of the vehicle in response to the imparted motion change, on the basis of the response information.

14. The control unit of claim 1, wherein the value indicative of the load bearing capability is a value indicative of a stiffness of the ground segment.

15. A vehicle comprising a control unit for determining a value indicative of a load bearing capability of a ground segment supporting a vehicle, the control unit configured to:
issue a control signal to the vehicle to thereby impart a motion change to the vehicle;
receive response information from the vehicle indicative of the vehicle's response to the imparted motion change;
based on the response information, determine a vertical position change of at least one wheel of the vehicle, and
based on the determined vertical position change and the imparted motion change, determine the value indicative of the load bearing capability of the ground segment.

16. A method for determining a value indicative of a load bearing capability of a ground segment supporting a vehicle, the method comprising:
imparting a motion change to the vehicle;
determining vertical position change of at least one wheel of the vehicle, and
based on the determined vertical position change and the imparted motion change, determining a value indicative of the load bearing capability of the ground segment.

17. The method according to claim 16, wherein the motion change comprises a speed change of the vehicle.

18. The method of claim 17, wherein the method comprises determining a magnitude and a direction of a speed change moment ($M_{SC}$) imparted to the vehicle from the speed change of the vehicle.

19. The method of claim 18, wherein the method comprises determining the speed change moment ($M_{SC}$) by determining a resulting moment ($M_R$) imparted to the vehicle after the speed change and also by determining a starting moment ($M_S$) imparted to the vehicle before the speed change.

20. The method of claim 16, wherein the motion change comprises a change of the vertical position of at least a portion of the vehicle relative to the ground segment.

21. The method of claim 20, wherein the method comprises issuing a signal to a wheel suspension system of the vehicle to thereby impart the vehicle the change of the vertical position of at least a portion of the vehicle relative to the ground segment.

22. The method of claim 20, wherein the method comprises imparting a torque to at least one wheel of the vehicle during the change of the vertical position of at least a portion of the vehicle relative to the ground segment, the method further comprising determining a value indicative of a friction between the wheel and the ground segment.

23. The method of claim 16, wherein the method comprises receiving response information from at least one of a wheel load sensor, a chassis inclination angle sensor, a vertical accelerometer, and an inclination rate sensor.

24. The method of claim 16, wherein the method comprising using information indicative of a rotational inertia along at least one axis of rotation of the vehicle when determining the value indicative of the load bearing capability of the ground segment.

25. The method of claim 16, wherein the method comprises setting a stiffness of a wheel suspension of one or more wheels of the vehicle to or above a predetermined stiffness threshold before imparting the motion change to the vehicle.

26. The method of claim 16, wherein the method comprises setting a tire pressure in one or more wheels of the vehicle to or above a predetermined pressure threshold before imparting the motion change to the vehicle.

27. The method of claim 16, wherein the method comprises receiving information indicative of a load individually imparted to at least one wheel of the vehicle during the motion change.

28. The method of claim 16, wherein the method comprises determining an inclination change of the vehicle in response to the imparted motion change on the basis of the response information.

29. The method of claim 16, wherein the value indicative of the load bearing capability is a value indicative of a stiffness of the ground segment.

* * * * *